| (12) | United States Patent | (10) Patent No.: | US 9,334,626 B2 |
|---|---|---|---|
| | Iwamoto | (45) Date of Patent: | May 10, 2016 |

(54) WORKING MACHINE

(71) Applicant: KUBOTA CORPORATION, Osaka (JP)

(72) Inventor: Teruhiko Iwamoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/661,304

(22) Filed: Mar. 18, 2015

(65) Prior Publication Data

US 2015/0275480 A1     Oct. 1, 2015

(30) Foreign Application Priority Data

Mar. 26, 2014   (JP) ................. 2014-064440

(51) Int. Cl.
*E02F 9/08* (2006.01)
*E02F 9/16* (2006.01)
*B62D 21/18* (2006.01)

(52) U.S. Cl.
CPC ............... *E02F 9/16* (2013.01); *E02F 9/0816* (2013.01); *E02F 9/0841* (2013.01); *E02F 9/0866* (2013.01); *E02F 9/0891* (2013.01); *B62D 21/186* (2013.01)

(58) Field of Classification Search
CPC .......... E02F 9/16; E02F 9/163; E02F 9/0841; E02F 9/0866; E02F 9/0891; E02F 9/0816; B62D 21/186

USPC ................ 180/291, 89.1, 89.12; 296/190.01, 296/190.08, 203.01, 204, 203.02

See application file for complete search history.

(56) References Cited

U.S. PATENT DOCUMENTS

| 6,568,746 | B2 * | 5/2003 | Sakyo | ............... B62D 33/0617 |
| | | | | 180/89.12 |
| 8,186,474 | B2 * | 5/2012 | Shioji | .................. B62D 21/186 |
| | | | | 180/312 |
| 8,944,493 | B2 * | 2/2015 | Kimura | ................ E02F 9/0858 |
| | | | | 296/190.09 |

FOREIGN PATENT DOCUMENTS

JP          5009933 B      6/2012

* cited by examiner

*Primary Examiner* — John Walters
(74) *Attorney, Agent, or Firm* — Greenblum & Bernstein, P.L.C.

(57) ABSTRACT

A working machine includes: a right side panel; a left side panel; and a joint structure configured to joint an upper portion of an intermediate portion of the right side panel and an upper portion of an intermediate portion of the left side panel to each other. The joint structure includes: a lower member configured to joint upper portions of the right side panel and the left side panel to each other; a upper member arranged above the lower member with a clearance kept from the lower member; a front joint member configured to joint a side of a front end of the upper member and a side of a front end of the lower member to each other; a rear joint member configured to joint a side of a rear end of the upper member and a side of a rear end of the lower member to each other.

5 Claims, 13 Drawing Sheets

WORKING MACHINE

CROSS-REFERENCE TO RELATED APPLICATIONS

The present application claims priority under 35 U.S.C. §119 to Japanese Patent Application No. 2014-064440, filed Mar. 26, 2014. The contents of this application are incorporated herein by reference in their entirety.

BACKGROUND OF THE INVENTION

1. Field of the Invention

The present invention relates to a working machine such as a wheel loader.

2. Description of the Related Art

Japanese Patent No. 5009933 discloses a wheel loader as a working machine.

The wheel loader includes a machine body for travel (hereinafter referred to as a travel machine body). The travel machine body is composed of: a front machine body provided with a front wheel; and a rear machine body provided with a rear wheel. The wheel loader including the travel machine body is configured by jointing the front machine body to the rear machine body, the front machine body can be freely turned centering around a vertical shaft center, that is, the wheel loader is an articulated working machine.

The rear machine body includes a machine frame having a pair of side panels, one of the side panels being provided on the right side (a right side panel) and the other one being provided on the left side (a left side panel), and the rear machine body includes a joint structure for jointing portions close to upper ends of the right side panel and the left side panel, the portions being, in a front-to-back direction, in the intermediate portion of the right side panel and the left side panel.

The joint structure includes: an attachment base welded to be fixed to a side closer to an outer surface of each of the right and left side panels; an attachment plate attached to an upper surface of each of the attachment bases provided on the right side and the left side; a gate-shaped member fixedly attached to the attachment plates by right and left lower ends, the right and left lower ends being each attached to the attachment plates provided on the same side in a right to left direction (or a left to right direction), the gate-shaped member being formed of a plate member folded and bended to be in a gate shape; a front surface plate provided to close a front surface of the gate-shaped member; and a reinforcement plate provided on a back surface of the front surface plate to joint between a lower surface of an upper wall of the gate-shaped member and an upper surface of the attachment plate.

SUMMARY OF THE INVENTION

Problems to be Solved by the Invention

In the conventional working machine, the joint structure includes the gate-shaped member formed of a plate member folded and bended to be in a gate shape, includes a pair of: the attachment base fixed to a machine frame; and the attachment plate for attaching the gate-shaped member to the attachment base in each of the right side and the left side, and includes the front surface plate and a pair of the reinforcement plates provided on the right side and the left side. Thus, the joint structure has a complicated configuration. In addition, the joint structure is required to ensure the strength.

Accordingly, considering the above-mentioned problems, the present invention intends to provide a working machine including the joint structure, the joint structure having a simple configuration capable of ensuring the strength.

Means of Solving the Problems

To solve the above-mentioned technical problems, techniques that the present invention provides are characterized in the following points.

In a first aspect of the present invention, a working machine includes: an operator seat; a right side panel provided on a right side of the operator seat; a left side panel provided on a left side of the operator seat; and a joint structure configured to joint an upper portion of an intermediate portion of the right side panel and an upper portion of an intermediate portion of the left side panel to each other, the joint structure including: a lower member configured to joint an upper portion of the right side panel and an upper portion of the left side panel to each other; an upper member provided above the lower member with a clearance kept from the lower member; a front joint member configured to joint a front portion of the upper member and a front portion of the lower member to each other; and a rear joint member configured to joint a rear portion of the upper member and a rear portion of the lower member to each other.

In a second aspect of the present invention, the working machine further includes: a wire harness configured to be installed between the lower member and the upper member to be wired from one of the right side panel and left side panel to the other side.

In a third aspect of the present invention, the lower member includes: an installation member extends between the upper portions of the right side panel and the left side panel to be welded to the right side panel and to the left side panel; and a plate member is overlapped with an upper surface of the installation member to be attached to the upper surface, the front joint member and the rear joint member joint the plate member and the upper member to each other, and the rear joint member is attached to a back surface of the installation member at a lower portion of the rear joint member.

In a fourth aspect of the present invention, the working machine further includes: a bottom plate configured to joint a lower portion of the right side panel and a lower portion of the left side panel to each other; an engine mounted on a rear portion of the bottom plate; an engine room for installation of the engine; and a front upper cover attached to the front joint member, wherein the joint structure is arranged in the front upper portion of the engine room, and the front upper cover covers the joint structure and covers a front upper portion of the engine room.

In a fifth aspect of the present invention, the working machine further includes: an engine hood configured to cover the engine from above and to be freely opened and closed; and a bracket for supporting the engine hood, the bracket being fixed to an upper surface of the upper member and pivotally supporting the engine hood to freely open and close the engine hood.

In a sixth aspect of the present invention, the working machine further includes: a gas spring configured to hold the engine hood to be opened; and a pivot configured to be pivotally jointed to the gas spring, the pivot being provided on each of the right side and left side of the upper member.

Effects of the Invention

According to the present invention, the following effects are provided.

According to the first aspect of the present invention, the joint structure is configured to joint upper portions of intermediate portions included in the right side panel and the left side panel. The joint structure is constituted of: a lower member arranged along a right to left direction, the lower member being configured to joint upper portions of the right side panel and the left side panel to each other; an upper member arranged above the lower member with a clearance kept from the lower member, the upper member being arranged elongating in the right to left direction; a plurality of front joint members configured to joint a side of a front end of the upper member and a side of a front end of the lower member to each other; and a plurality of rear joint members configured to joint a side of a rear end of the upper member and a side of a rear end of the lower member to each other. In this manner, the joint structure can be a structure composed of simple members and having a box-shape seen from the side, serving as a structure capable of securing strength in a simple form.

According to the second aspect of the present invention, a wire harness can be wired from one of the right side and left side of the machine frame to the other side in a short distance, thereby reducing a production cost and preventing reduction of voltage at a terminal of the wire harness.

According to the third aspect of the present invention, an assembly, the assembly being composed of a plate member, an upper member, a front joint member, and a rear joint member, is fixed to an installation member, the installation member extending between the right side panel and the left side panel and being welded to be fixed to the right side panel and to the left side panel; thus the joint structure can be attached to the machine frame. In this manner, the joint structure can be easily attached to the machine frame.

According to the fourth aspect of the present invention, the joint structure, the joint structure being configured to joint the right side panel and left side panel of the machine frame to each other, is composed of a member separate from a member forming a front upper cover configured to cover the front upper portion of the engine room. In this manner, the joint structure can be formed in a simple shape.

According to the fifth aspect of the present invention, a bracket for supporting the engine hood is fixed to an upper surface of the upper member, the bracket pivotally supporting the engine hood to be capable of freely opening and closing the engine hood. In this manner, the engine hood can be firmly supported.

According to the sixth aspect of the present invention, a pivot is provided on both of the right side and left side of the upper member of the joint structure, the pivot is configured to be pivotally jointed to a gas spring for holding the engine hood to be opened. In this manner, the engine hood can be firmly supported to be opened.

DESCRIPTION OF THE EMBODIMENTS

Referring to drawings, an embodiment of the present invention will be described below.

Figure 1:
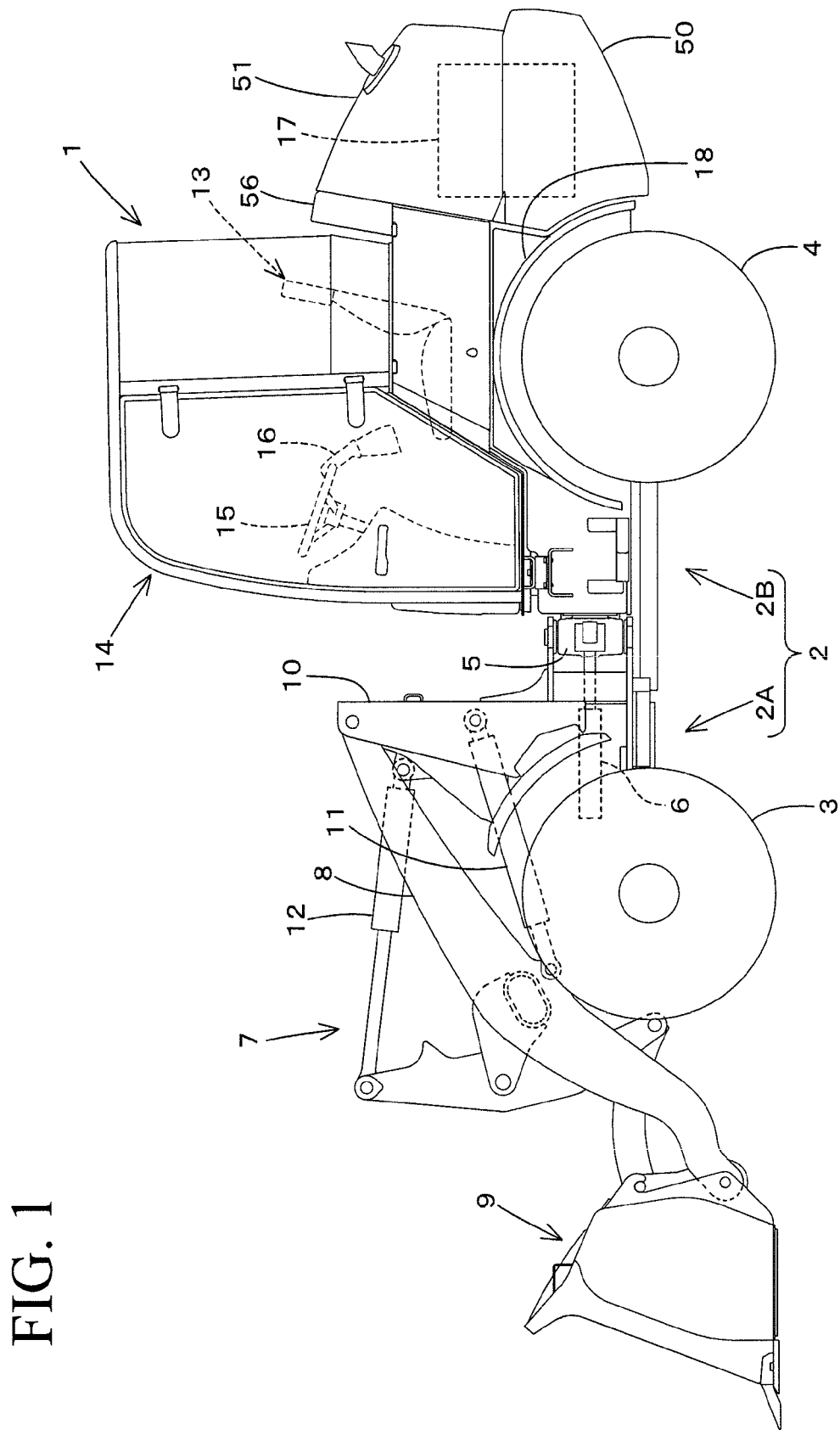
FIG. 1 is a side view of a wheel loader.
Figure 2:
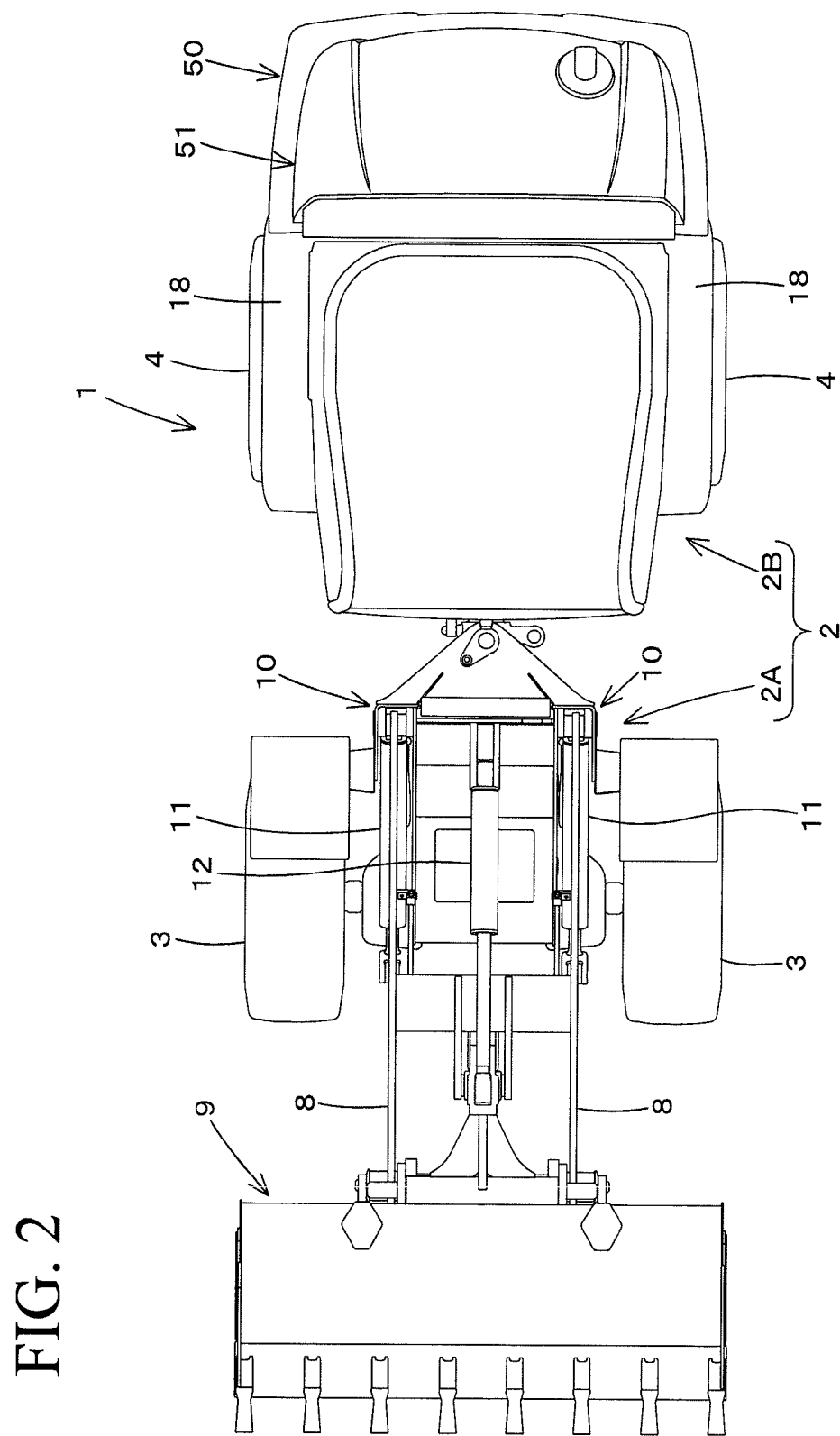
FIG. 2 is a plan view of the wheel loader.

FIG. 1 and FIG. 2 exemplify a wheel loader 1 as a working machine.

As shown especially in FIG. 2, the wheel loader 1 is an articulated working machine including a machine body 2 for travel (hereinafter referred to as a travel machine body 2). The travel machine body 2 is composed of a front machine body 2A and a rear machine body 2B. The front machine body 2A is provided with a pair of front wheels 3, one of the front wheel 3 being provided on a right side of the front machine body 2A and the other being provided on a left side of the front machine body 2A. The rear machine body 2B is provided with a pair of rear wheels 4, one of the rear wheel 4 being provided on a right side of the rear machine body 2B and the other being provided on a left side of the rear machine body 2B.

The rear machine body 2B is provided with a machine-body coupling member 5 (hereinafter referred to as a machine-body coupler 5) at a position close to a front end of the rear machine body 2B. The machine-body coupler 5 is capable of freely turning (revolving) about an anteroposterior axis directed from the front toward the back (or a posteroanterior axis directed from the back toward the front) within a predetermined range.

A steering cylinder 6 is provided extending (striding) between the machine-body coupler 5 and the front machine body 2A, the steering cylinder 5 is composed of a hydraulic cylinder. Stretching and shortening of the steering cylinder 6 enable the front machine body 2A to swing (move) rightward and leftward to the rear machine body 2B, thereby enabling the wheel loader 1 to turn to the right direction and to the left direction.

In addition, the front machine body 2A is provided with an operation unit 7 (a front operation unit). The operation unit 7 includes a bucket 9 and a pair of lift arms 8, that is, a right lift arm 8 and a left lift arm 8. The front machine body 2A is provided with a support frame 10. The right lift arm 8 is supported by the support frame 10 at a side closer to a base end of the right lift arm 8 so that the right lift arm 8 can freely turn about an axis directed to a right to left direction (or a left to right direction), thereby being enabled to swing upward and downward. The left lift arm 8 is supported by the support frame 10 in the same manner as the above described manner of the right lift arm 8. The bucket 9 is pivotally supported by and jointed to the right lift arm 8 and the left lift arm 8 at sides closer to tip ends of the lift arms 8, thereby being enabled to freely swing about the axis directed to the right to left direction (or the left to right direction). The right lift arm 8 and the left lift arm 8 are driven by a lift cylinder 11. The bucket 9 is driven by a bucket cylinder 12. The lift cylinder 11 and the bucket cylinder 12 are each constituted of a hydraulic cylinder.

Moreover, the bucket 9 is provided to be detachable from and attachable to the lift arms, accordingly an attachment such as a sweeper, a mower, and a breaker can be attached to the sides closer to tip ends of the lift arms 8 instead of the bucket 9.

The rear machine body 2B is provided with an operator seat 13, a cabin 14, a steering wheel 15, an operation lever 16 for the operation unit, an engine 17, and a rear wheel fender 18. The operator seat 13 is arranged between the right rear wheel 4 and the left rear wheel 4. The cabin 14 serves as a device for protecting the operator seat (an operator seat protection device). The steering wheel 15 is used for operating the steering cylinder 6. The operation lever 16 is used for operating the operation unit 7. The engine 17 is a diesel engine. The rear wheel fender 18 is used for covering each of the rear wheel 4 from above.

Meanwhile, a tetrastyle (four pillars) canopy may be employed as the operator seat protection device.

As shown in FIG. 3, FIG. 4, FIG. 5, and FIG. 6, the rear machine body 2B includes a machine body frame 19 in a rear portion of the rear machine body 2B; the engine 17 is mounted on the machine body frame 19.

The machine body frame 19 includes a pair of side panels 20 each formed of a thick plate, that is, a right side panel 20 and a left side panel 20. Each of the right side panel 20 and the left side panel 20 includes an intermediate portion 20A, a front portion 20B, and a rear portion 20C, the intermediate portion 20A is formed at an intermediate position of the side panel 20 in an anteroposterior direction that is a direction from the front toward the back (or a posteroanterior direction that is a direction from the back toward the front), the front portion 20B is formed in front of the intermediate portion 20A, the rear portion 20C is formed behind the intermediate portion 20A. The front portion 20B and the rear portion 20C are formed to be lower than the intermediate portion 20A.

The rear machine body 2B includes a bottom plate 21. The bottom plate 21 joints sides closer to lower ends of the right side panel 20 and the left side panel 20 to each other.

Figure 4:
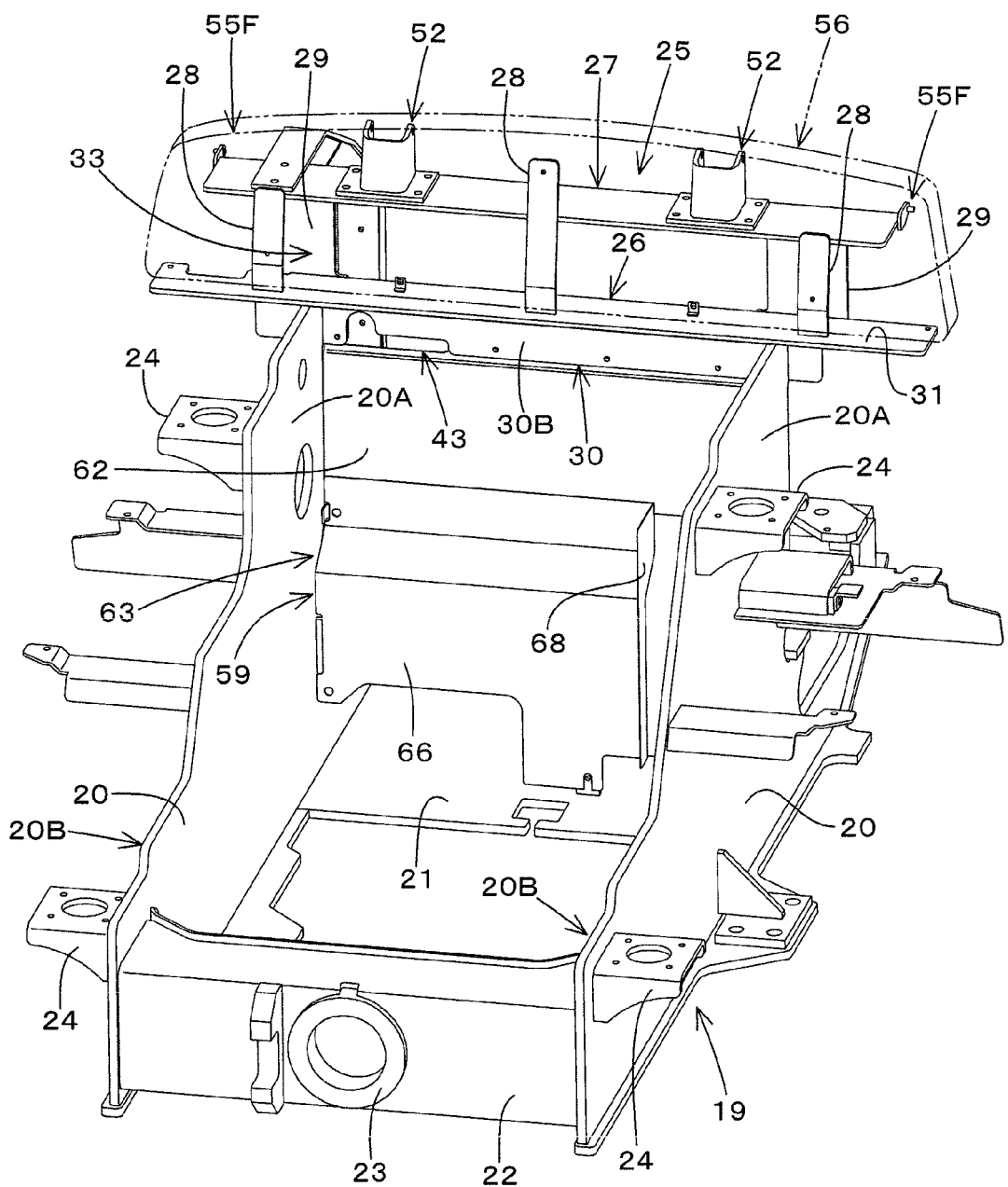
FIG. 4 is a perspective view of a machine frame.

As shown in FIG. 4, the rear machine body 2B includes a frame-front joint member 22. The frame-front joint member 22 joints sides closer to front ends of the right side panel 20 and the left side panel 20 to each other. The frame-front joint member 22 is provided with a support portion 23 for supporting the machine-body coupler 5, the support portion 23 is provided on an intermediate portion of the frame-front joint member 22 in the right to left direction (or the left to right direction) to support the machine-body coupler 5 so that the machine-body coupler 5 can freely turn (revolve) about the anteroposterior axis (or the posteroanterior axis).

The rear machine body 2B includes mount brackets 24. One of the mount brackets 24 is fixed to an outer surface of the front portion 20B of the right side panel 20 in the right to left direction (or the left to right direction). Another mount bracket 24 is fixed to an outer surface of the front portion 20B of the left side panel 20 in the right to left direction (or the left to right direction). And, of the remaining mount brackets 24, one of the remaining mount brackets 24 is fixed to an outer surface of an upper portion of the intermediate portion 20A of the right side panel 20 in the right to left direction (or the left to right direction). Another remaining mount bracket 24 is fixed to an outer surface of an upper portion of the intermediate portion 20A of the left side panel 20 in the right to left direction (or the left to right direction). Each of the mount brackets 24 is provided with an anti-vibration mount having an anti-vibration rubber.

As shown in FIG. 4, the rear machine body 2B includes a joint structure 25. The joint structure 25 joints the upper portions of the intermediate portions 20A provided in the right side panel 20 and the left side panel 20 to each other. The joint structure 25 is composed mainly of a lower member 26, an upper member 27, a plurality of front joint members 28, and a plurality of rear joint members 29.

The lower member 26 is arranged along the right to left direction (or the left to right direction), specifically, provided extending over between upper ends of the intermediate portions 20A of the right side panel 20 and the left side panel 20. The lower member 26 is constituted of an installation member 30 and a plate member 31.

Figure 5:
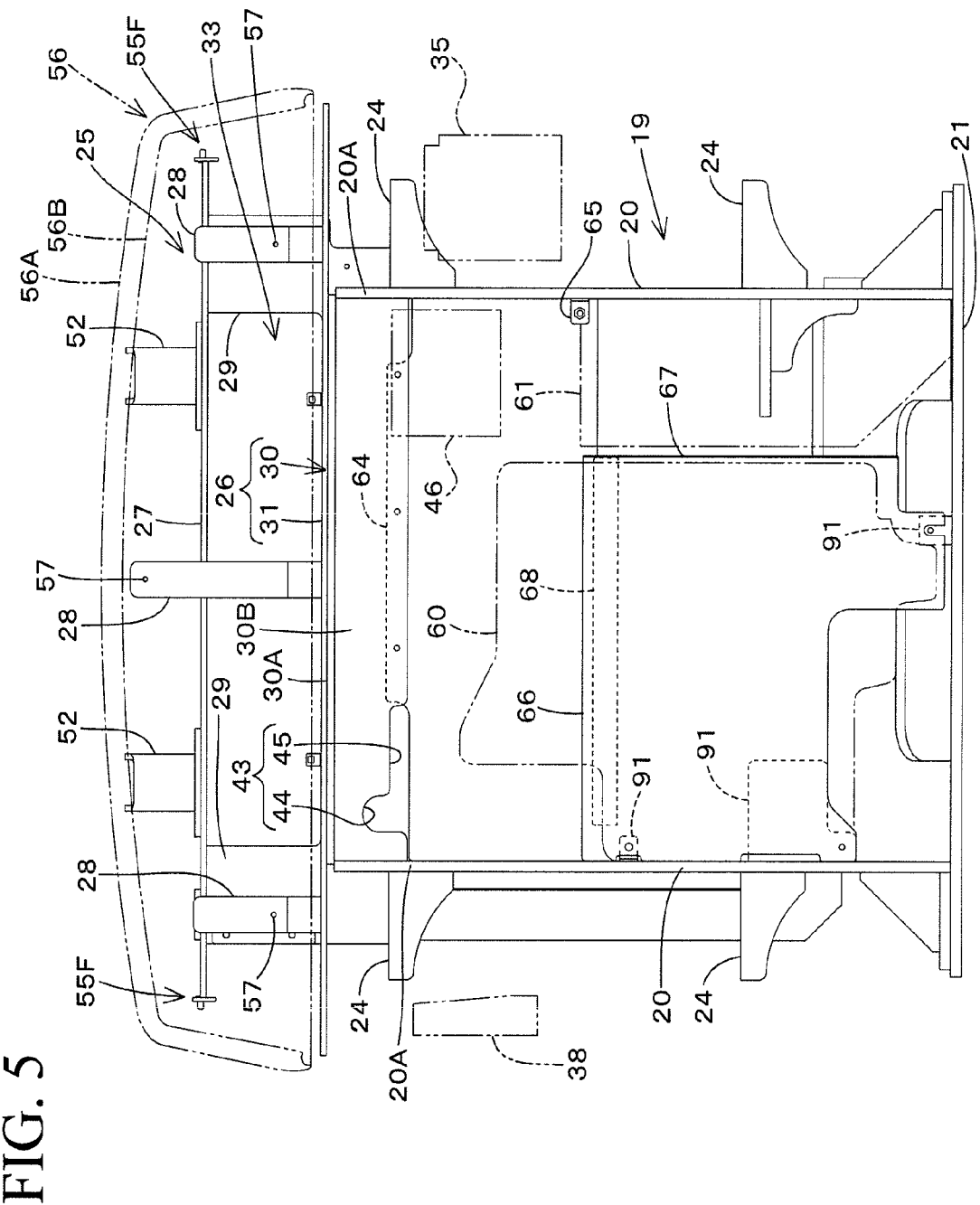
FIG. 5 is a front view of the machine frame.
Figure 6:
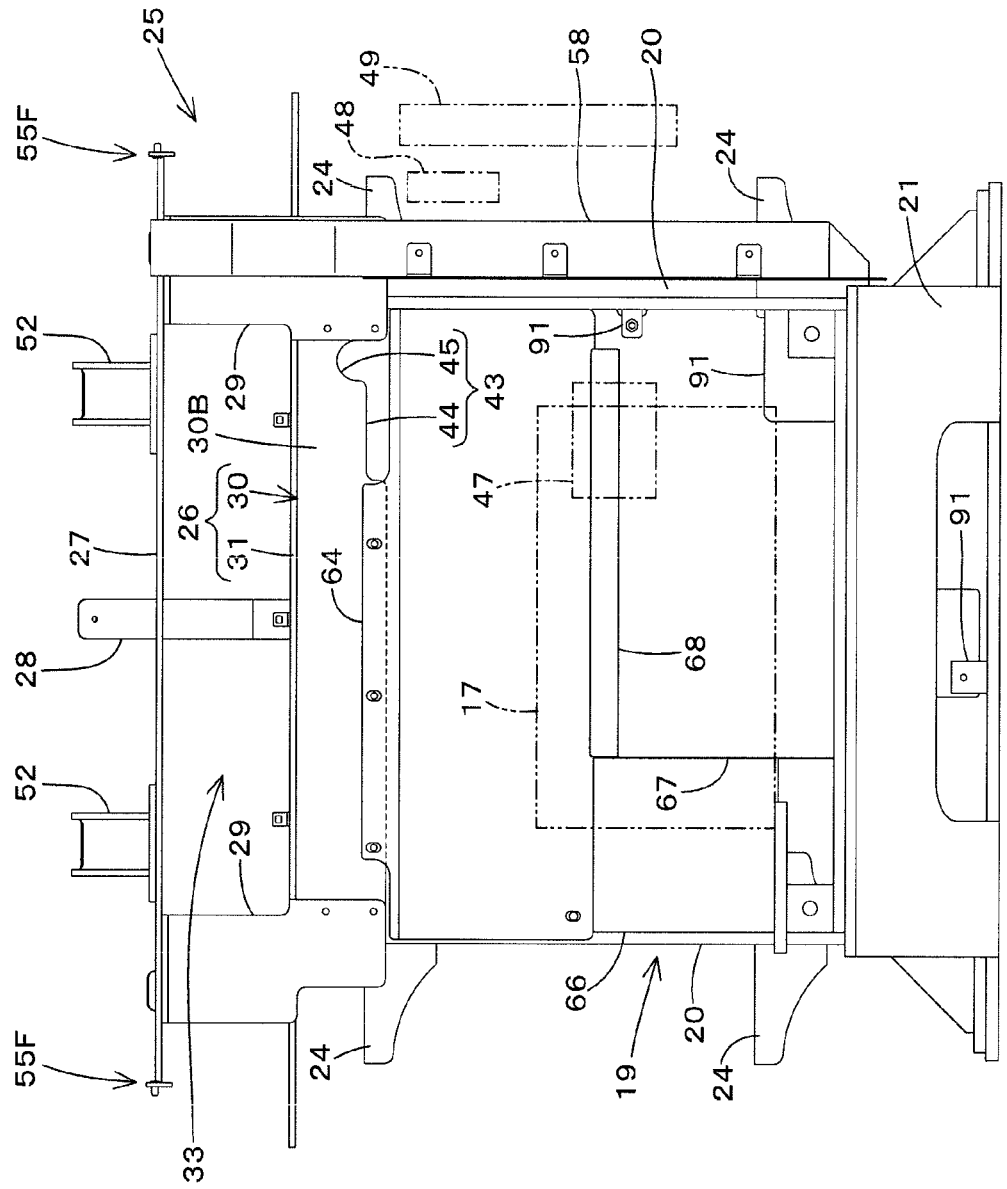
FIG. 6 is a back view of the machine frame.

The installation member 30 is provided extending (striding) over between the upper ends of the intermediate portions 20A of the right side panel 20 and the left side panel 20, and is welded to be fixed to the right side panel 20 and the left side panel 20. As shown in FIG. 4 and FIG. 5, the installation member 30 is formed of plate members horizontally elongate in the right to left direction (or the left to right direction), thus having an L-shape in a side view; the plate members include an upper wall 30A and a back wall 30B, the upper wall 30A being provided extending (laying) over between the upper ends of the intermediate portions 20A of the right side panel 20 and the left side panel 20, the back wall 30B being provided extending (laying) over between back ends of upper portions of the intermediate portions 20A of the right side panel 20 and the left side panel 20 to be extended downward from a back end of the upper wall 30A.

The plate member 31 is formed of a horizontally-long plate member elongate in the right to left direction (or the left to right direction), and is arranged so that surfaces of the plate member can face upward and downward. The surface facing downward of the plate member is stacked on an upper surface of the upper wall 30A of the installation member 30; the plate member is attached to and fixed to the upper surface 30A by a bolt and the like. The plate member 31 protrudes from the installation member 30 toward an outward direction along the right to left direction (or along the left to right direction) at both of a right side and a left side.

In the embodiment, the outward direction along the right to left direction (or along the left to right direction) is a direction toward an end portion in the right to left direction (or in the left to right direction) of the wheel loader 1 from a center portion in the right to left direction, the right to left direction (or the left to right direction) being a horizontal direction perpendicular to a direction from a front portion of the rear machine body 2B toward a rear portion of the rear machine body 2B, hereinafter the direction being referred to as an "R to L outward".

The upper member 27 is formed of a plate member horizontally elongate in the right to left direction (or the left to right direction). The upper member 27 is arranged so that surfaces of the plate member can face upward and downward, and is arranged above the plate member 31 to keep a clearance from and to be in parallel with the plate member 31.

As shown in FIG. 4, the front joint member 28 is formed of a plate member elongate in a vertical direction, and is arranged on a side closer to front ends of the upper member 27 and the plate member 31. In the embodiment, the joint structure 25 includes a plurality of the front joint members 28. Three of the front joint members 28 are provided along the right to left direction (or the left to right direction), specifically, are arranged on the upper member 27 and the plate member 31 at both of the right side and the left side and at the center portion in the right to left direction. The front joint member 28 is welded to be fixed to an upper surface of the plate member 31 at a lower end of the front joint member 28, and is welded to be fixed to a front end of the upper member 27 at a back surface of an upper portion of the front joint member 28. The front joint member 28 is jointed to a side of a front end of the upper member 27 and to a side of a front end of the plate member 31 (the lower member 26), thereby jointing the upper member 27 and the plate member 31 (the lower member 26) to each other.

The rear joint member 29 is formed of a plate member, the plate member is vertically long and wide laterally along the right to left direction (or the left to right direction). The rear joint member 29 is arranged on a side of a back end of the plate member 31. In the embodiment, two rear joint members 29 are provided adjoining to each other in the right to left direction (or the left to right direction); one of the rear joint members 29 is arranged on right sides of the upper member 27 and of the plate member 31, and the other one is arranged on left sides of the upper member 27 and of the plate member 31. As shown in FIG. 7, the rear joint member 29 is formed of an upper wall 29A and a front wall 29B to be in an L-shape, the upper wall 29A being overlaid on a lower surface of a rear portion of the upper member 27 and welded to be fixed to the upper member 27, the front wall 29B being extended downward from a front end of the upper wall 29A and being welded to be fixed to a back end of the plate member 31 at a front surface of a lower portion of the front wall 29B. The rear joint member 29 is jointed to a side of the upper member 27 and to a side of the plate member 31 (the lower member 26), thereby jointing the upper member 27 and the plate member 31 (the lower member 26) to each other. In addition, a lower portion of the front wall 29B is extended downward from the plate member 31, the front wall 29B being included in each of the rear joint members 29. The extended portion is stacked on a back surface of a back wall of the installation member 30 and is fixed to the back surface by bolts.

Figure 7A:
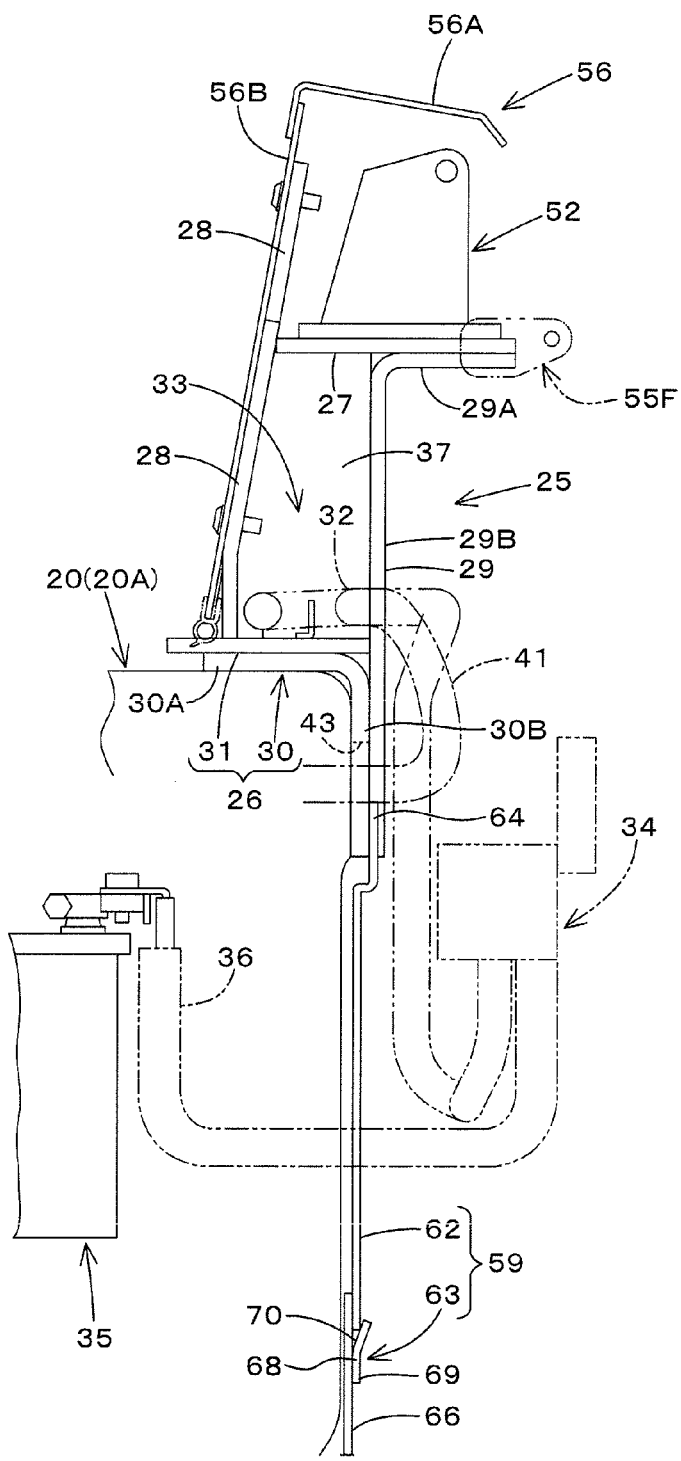
FIG. 7A is a cross-sectional view of an upper portion of the machine frame.
Figure 7B:
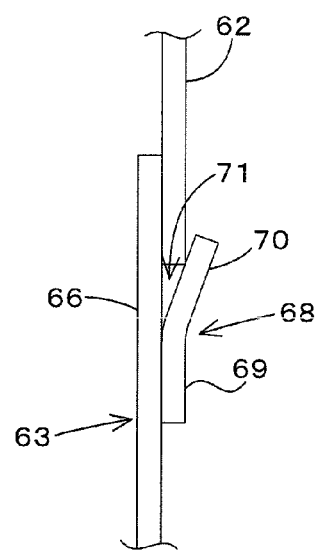
FIG. 7B is a cross-sectional view of a part of the upper portion of the machine frame.
Figure 8:
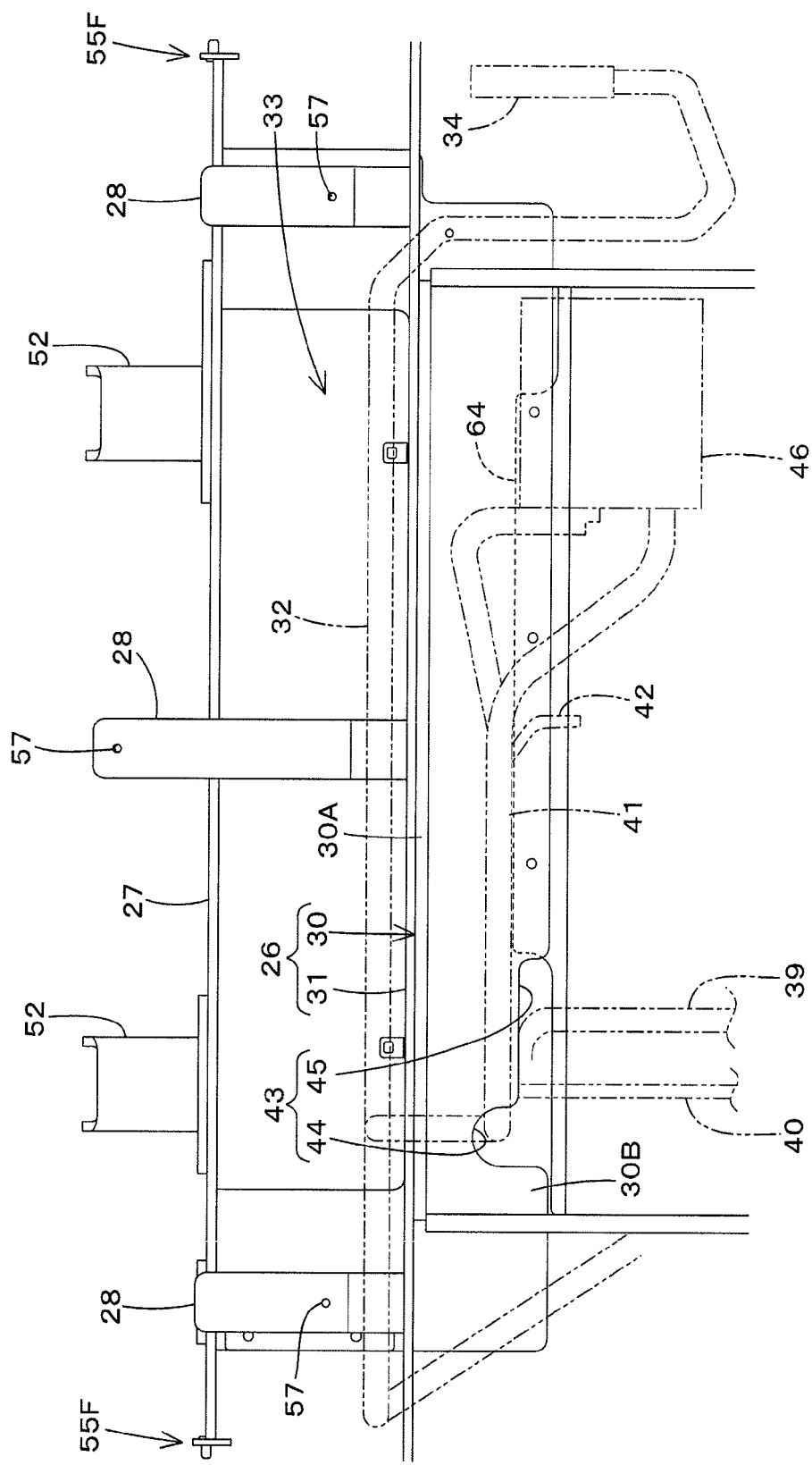
FIG. 8 is an enlarged view of a front upper portion of the machine frame.
Figure 9:
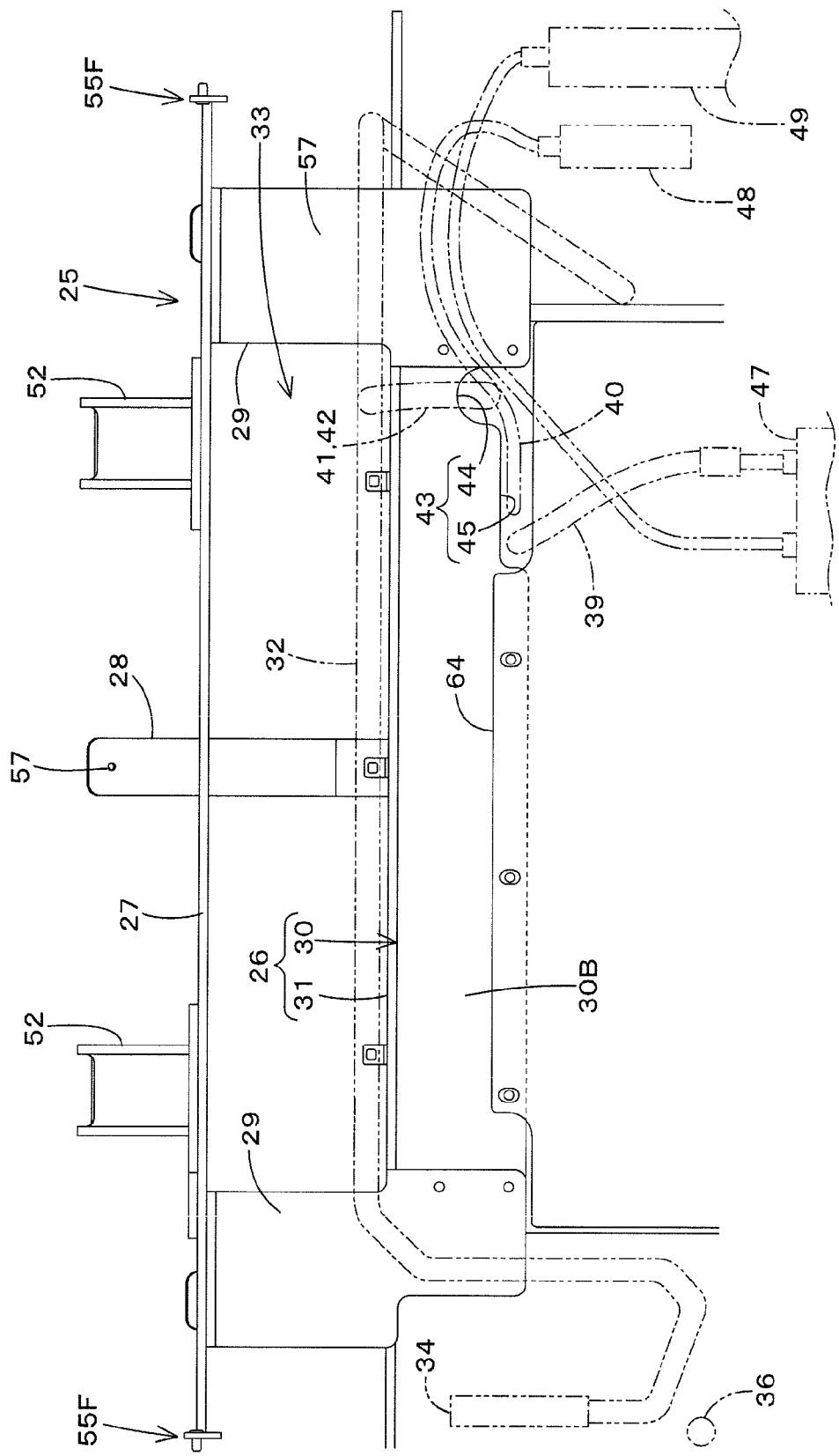
FIG. 9 is an enlarged view of a back upper portion of the machine frame.

As shown in FIG. 7, FIG. 8, and FIG. 9, a harness wiring path 33 is provided as a space (a clearance) between the lower member 26 and the upper member 27 (the plate member 31), the harness wiring path 33 serving as a path used for wiring a wire harness 32 from one of the right side and left side of the machine frame 19 to the other side.

One end (a left end) of the wire harness 32, the wire harness 32 being wired in the harness wiring path 33, is connected to a left side of a front portion of an engine room that is a space for installation of the engine 17, the left side of the front portion corresponds to a slow-blow fuse box 34 provided on a left side of the machine frame 19. A battery 35 is provided in front of the slow-blow fuse box 34 and on a left side of the intermediate portion 20A of the side panel 20 of the machine frame 19. A power source harness 36 for power supply is connected to the slow-blow fuse box 34, the power source harness 36 being arranged from the battery 35.

The other end (a right end) of the wire harness 32, the wire harness 32 being wired in the harness wiring path 33, penetrates a partition member 37 to be arranged to the right side of the machine frame 19, the partition member 37 being provided between the upper member 27 and the lower member 26 both included in the joint structure 25, and then the other end of the wire harness 32 is arranged to the front side. Instruments such as meters, electronic components used for the operation lever for the operation unit, and a fuse box 38 used for electric components such as lamps are arranged on a right side of the intermediate portion 20A of the side panel 20 of the machine frame 19. The other end of the wire harness 32 is connected to the fuse box 38.

An arranged-member insertion portion 43 is formed on a right side of the back wall 30B of the installation member 30. The arranged-member insertion portion 43 is a hole (an opening) for inserting arranged members 39 to 42, that is, pipe members 39 and 40 for an air conditioner (hoses for the air conditioner) and wire harnesses 41 and 42. The arranged members 39 to 42 are each arranged from a side of the engine room to a side of the front of the installation member 30 (to a side of the front a front partition cover described below).

The arranged-member insertion portion 43 is a cutout formed in the back wall of the installation member 30, a rim of the cutout being opened downward. The cutout includes: a first cutout portion 44 provided on the right side; and a second cutout portion 45 provided on the left side. When seen from the front, the first cutout portion 44 is formed to have a half-oval shape. Additionally, when seen from the front, the second cutout portion 45 is extended from a lower portion of the first cutout portion 44 toward the right side and the left side, being formed to have a horizontally-long shape elongated in the right to left direction (or the left to right direction). In the embodiment, the wire harnesses 41 and 42 are inserted to the first cutout portion 44, and the pipe members 39 and 40 for an air conditioner are inserted to the second cutout portion 45.

The wire harnesses 41 and 42 inserted to the first cutout portion 44 are wire harnesses branching off from the wire harness 32 arranged in the harness wiring path 33. In the embodiment, of the branching wire harnesses 41 and 42, the wire harness 41 is connected to an ECU (Engine Control Unit) 46 attached to the left side of a front surface of the back wall 30B included in the installation member 30 (arranged on the left side of an upper portion included in a front surface of the front partition cover described below), and the wire harness 42 is connected to a sensor for detecting a surface of liquid in a fuel tank 60 described below.

Of the pipe members 39 and 40 for an air conditioner, the pipe members 39 and 40 being inserted to the second cutout portion 45, the pipe member 39 is a refrigerant return hose (referred to as a refrigerant return hose 39) for returning refrigerant from a main body 83 of an air conditioner (hereinafter referred to as an air conditioner main body 83) described below to a compressor 47, the air conditioner main body 83 having an evaporator and a blower fan, and the pipe member 40 is a refrigerant supply hose (referred to as a refrigerant supply hose 40) for supplying the refrigerant from a receiver 48 of the air conditioner to the air conditioner main body 83.

The compressor 47 included in the air conditioner is arranged on a front of a right side of the engine 17. The receiver 48 and a condenser 49 are arranged on a right side to the engine 17.

As shown in FIG. 7A, the joint structure 25 is composed of simple members. When seen from the side, the joint structure 25 is a structure having a box-shape, serving as a structure capable of securing strength in a simple form.

In addition, the installation member 30 is welded to be fixed to the right side panel 20 and left side panel 20; an assembly, the assembly being composed of the plate member 31, the upper member 27, the front joint members 28, and the rear joint members 29, is fixed to the installation member 30 with bolts; thus the joint structure 25 can be attached to the right side panel 20 and to the left side panel 20. In this manner, the joint structure 25 can be easily attached to the machine frame 19.

In addition, the harness wiring path 33 is provided as the space between the upper member 27 and the lower member 26, the harness wiring path 33 serving as a path for wiring a wire harness 32 from one of the right side and left side of the machine frame 19 to the other side, thereby wiring the wire harness 32 in a short distance in the right to left direction (or the left to right direction) from one of the right side and left side of the machine frame 19 to the other side. The wiring can reduce a production cost and prevent a voltage from reducing at a terminal of the wire harness 32.

The engine 17 is mounted on a rear portion of the machine frame 19 between the right side panel 20 and the left side panel 20. In addition, a weight 50 is attached to be fixed to the rear portion of the machine frame 19. The weight 50 covers a lower portion of the engine room at both of a right side and left side of and at a back side of the engine room.

An engine hood 51 covers an upper portion of the engine room at both of a right side and left side of and at an upper side of the engine room.

A pair of brackets 52 for supporting the engine hood 51 are attached to be fixed to an upper surface of the upper member 27 included in the joint structure 25, one of the brackets 52 being provided on the right side of the upper member 27 and the other one being provided on the left side of the upper member 27. A front portion of an arm 53 for supporting the engine hood 51 is pivotally supported by each of the brackets 52 for supporting the engine hood 51, thereby being capable of freely swinging upward and downward about the axis directed to the right to left direction (or the left to right direction). A rear portion of each of the arms 53 for supporting the engine hood 51 is attached to a lower surface of the engine hood 51. In this manner, the engine hood 51 is supported by the brackets 52 with the arms 53 interposed between the engine hood 51 and the brackets 52, thereby being capable of freely swinging upward and downward.

The brackets 52 for supporting the engine hood 51 are fixed to the upper surface of the upper member 27 included in the joint structure 25, thereby firmly supporting the engine hood 51.

In addition, gas springs 54 are arranged on both of the right side and left side of a lower surface of the engine hood 51, the gas spring being used for holding the engine hood 51 to be opened.

Front pivots 55F are provided on both of the right side and left side of the upper member 27 included in the joint structure 25. The gas spring 54 is pivotally jointed to the front pivot 55F at a front end of the gas spring 54. Rear pivots 55R are provided on the lower surface of the engine hood 51. The gas spring 54 is pivotally jointed to the rear pivot 55R at a rear end of the gas spring 54.

The front pivots 55F are provided on both of the right side and left side of the upper member 27 included in the joint structure 25, the front pivot 55F pivotally supporting the gas spring 54 for supporting the engine hood 51 to be opened. In this manner, the providing of the front pivots 55F enables to firmly support the opened engine hood 51.

Figure 3:
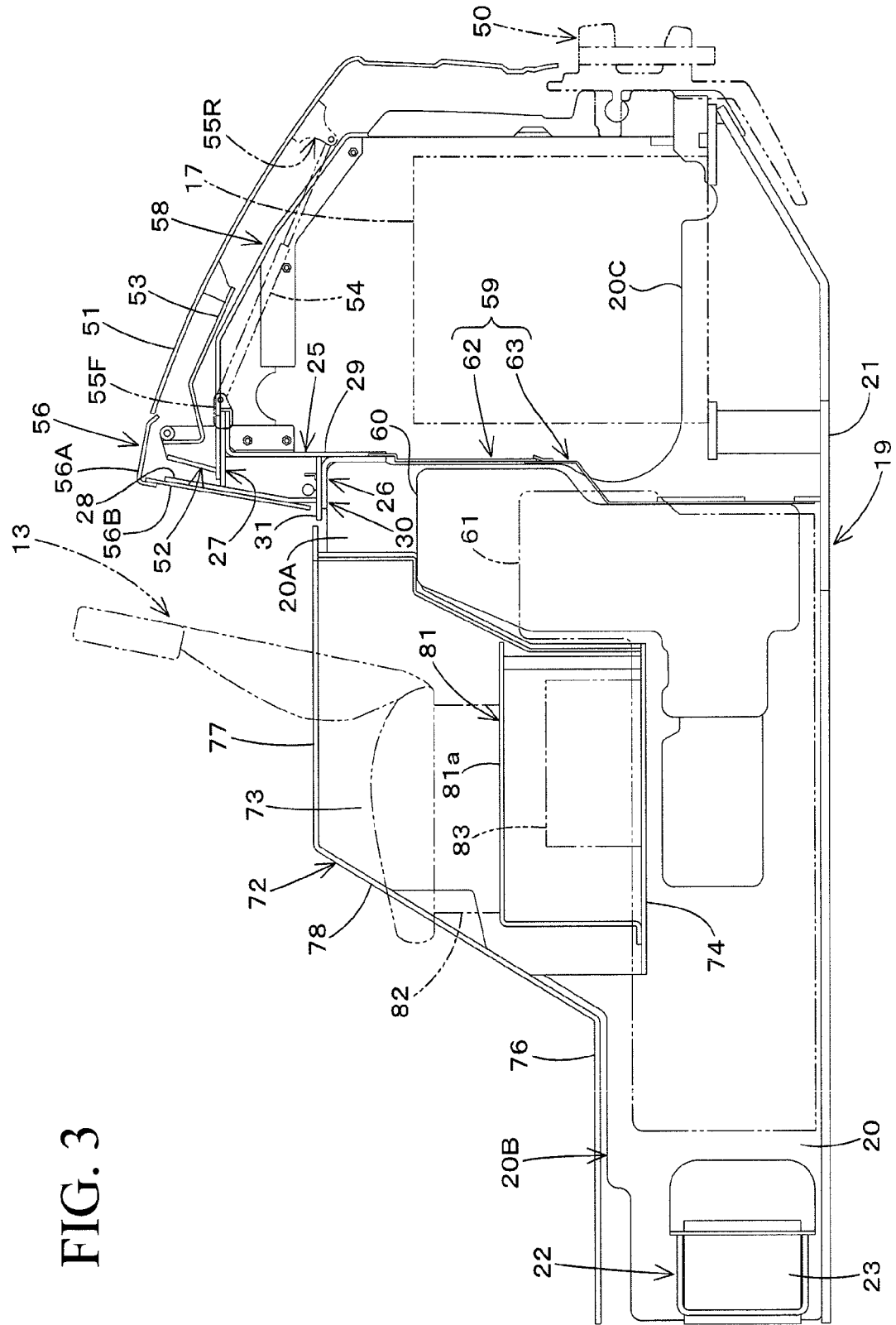
FIG. 3 is a cross-sectional view of a side surface of a rear machine body.

As shown in FIG. 1, FIG. 3, and FIG. 5, a front upper cover 56 is provided in front of the engine hood 51, the front upper cover 56 being shown by a two-dot chain line in FIG. 5. The front upper cover 56 covers the joint structure 25, thus covering in front of an upper portion of the engine hood 51. The front upper cover 56 is constituted of: a gate-shaped member 56A formed to have a gate shape, seen from the front; and a front plate 56B for covering a front surface of the gate-shaped member 56A.

As shown in FIG. 7A and FIG. 8, the front plate 56B is attached to be fixed to each of the front joint members 28 by bolts and the like inserted (or screwed) into attachment holes 57, the attachment hole 57 is formed in each of the front joint members 28 included in the joint structure 25. As shown in FIG. 5, a right side and left side of the gate-shaped member 56A are attached to be fixed to the upper member 27 by bolts at a side of a lower end of the gate-shaped member 56A.

For example, when introducing a function that serves as the front upper cover 56 for covering a front upper portion of the engine room to the joint structure 25, the joint structure 25 jointing the right side panel 20 and left side panel 20 of the machine frame 19 to each other, the joint structure 25 may require a complex form (configuration) for the introduction. In the embodiment, the joint structure 25 and the front upper cover 56 are each formed of different member separated from one another, the joint structure 25 jointing the right side panel 20 and left side panel 20 of the machine frame 19 to each other, the front upper cover 56 covering the front upper portion of the engine room to the joint structure 25. In this manner, the joint structure 25 can be simply formed (configured).

An attachment bracket is additionally fixed to the joint structure 25, the attachment bracket for fixedly mounting auxiliaries (for example, an air cleaner and the like) equipped to the engine 17.

A radiator not shown in the drawings is arranged on the right side of the engine 17. A support leg 58 is provided between the radiator and the engine 17, the support leg 58 for mounting a fan shroud for covering a fan of the radiator. The supporting leg 58 extends downward and backward from the right side of the joint structure 25 and further extends downward at a portion close to a back end of the support leg 58. The supporting leg 58 is jointed to the joint structure 25 at a portion close to an upper front end of the supporting leg 58 and to the machine frame 19 at a lower back end of the supporting leg 58, being jointed to the right side of the joint structure 25 and to the right side of the machine frame 19.

As shown in FIG. 3 and FIG. 4, a front partition cover 59 is provided between the intermediate portions 20A of the right side panel 20 and left side panel 20 included in the machine frame 19, the front partition cover 59 divides the engine room to separate a front side of the engine room. The engine room is formed of the front partition cover 59, the front upper cover 56, the engine hood 51, the weight 50, the bottom plate 21, and the like.

As additionally shown in FIG. 5, the fuel tank 60 and a hydraulic operation fluid tank 61 each shown by a two-dot chain line are arranged in front of the front partition cover 59, being adjacent to each other in the right to left direction (or the left to right direction).

The front partition cover 59 is arranged on a side of a back end between the intermediate portions 20A of the right side panel 20 and left side panel 20 included in the machine frame 19. The front partition cover 59 is constituted of an upper cover 62 and a lower cover 63 (the front partition cover 59 can be separated into the upper cover 62 and the lower cover 63).

As shown in FIG. 5 to FIG. 9, the upper cover 62 is formed of a sheet of plate member, the upper cover 62 is provided extending over between the right side panel 20 and left side panel 20 to orient the plate surfaces of the upper cover 62 forward and backward. An attachment portion 64 is formed in an intermediate portion of the upper cover 62, the intermediate portion being formed to protrude upward and to extend along the right to left direction (or the left to right direction). The attachment portion 64 is overlapped with the back wall 30B on a left side of the arranged-member insertion portion 43, the attachment portion being overlapped with a back surface of a lower portion of the back wall 30B included in the installation member 30. Thus, the attachment portion 64 is detachably attached to be fixed to the installation member 30 by bolts and nuts. In addition, a left end of the upper cover 62 is detachably attached to be fixed to an attachment stay 65 at a portion close to a lower end of the left end by bolts and the like, the attachment stay 65 being fixedly attached to the left side panel 20.

The upper cover 62 closes a side of a lower end of the arranged-member insertion portion 43 by a side of an upper edge formed on a right side of the attachment portion 64 of the upper cover 62.

The lower cover 63 is constituted of a lower cover main body 66, a side cover plate 67, and a groove-forming member 68, the side cover plate 67 is provided on a portion close to a left end of the lower cover main body 66, the groove-forming member 68 is provided on an upper portion formed on a side of a back surface of the lower cover main body 66.

In the embodiment, the lower cover main body 66 is formed of a sheet of plate member, the lower cover main body 66 is provided extending from the right side panel 20 included in the machine frame 19 to a back end of the side cover plate 67. In this manner, the lower cover main body 66 is attached to be fixed to an attachment stay 91 by bolts, the attachment stay 91 being provided on the machine frame 19. The side cover plate 67 is arranged making plate surfaces of the side cover plate 67 face the right direction and the left direction and keeping a clearance in the right to left direction (or the left to right direction) with the left side plate 20 of the machine frame 19. In this manner, an opened space is formed between the lower cover main body 66 and the left side plate 20. The hydraulic operation fluid tank 61 is arranged in front of the opened space.

However, the lower cover main body 66 may be formed of a plurality of plate members.

The groove-forming member 68 is formed of a long plate member elongate in the right to left direction (or the left to right direction), the groove-forming member 68 is arranged on an upper portion of a back surface of the lower cover main body 66. As shown in FIG. 7, the groove-forming member 68 includes: an attachment wall 69 provided in a lower portion (hereinafter referred to as a lower attachment wall 69), the attachment wall 69 being overlapped with a back surface of the lower cover main body 66 to be fixed to the lower cover main body 66 by welding; and a tilt wall 70 extended backward and diagonally upward from an upper edge of the lower attachment wall 69. A support groove 71 is constituted of: the tilt wall 70 of the groove-forming member 68; and an upper portion of the lower cover main body 66. Then, a lower end of the upper cover 62 is inserted to the support groove 71 with the upper cover 62 kept freely movable in the right to left direction (or the left to right direction), thus the support groove 71 supports the upper cover 62.

Accordingly, releasing the fixation to an upper end portion of the lower cover 63 (the fixation of the attachment portion 64 to the installation member 30), releasing the fixation to a lower end portion on a left side of the lower cover 63, and moving the upper cover 62 toward the left side to remove the upper cover 62, the front upper portion of the engine room can be opened. The opening improves accessibility to the front portion of the engine room to make the maintenance smooth.

Meanwhile, the upper cover 62 is not necessarily required to be removed in the maintenance; only moving the upper cover 62 toward the left side, the front upper portion of the engine room can be opened. Additionally, in a case where the radiator is arranged on the left side of the engine room, the front upper portion of the engine room (the front portion of the engine 17) is opened by moving the upper cover 62 to the right side.

In addition, the installation member 30 is provided with the arranged-member insertion portion 43 used for installing the arranged members 39 to 42 each arranged from the side of the engine room to the front side of the upper cover 62, the installation member 30 being used for attachment and fixation to the upper end portion of the upper cover 62. In this manner, the upper cover 62 moving toward one of the right side and left side can be prevented from being interrupted by the arranged members 39 to 42, thereby opening the front upper portion of the engine room.

Moreover, moving the upper cover 62 toward one of the right side and left side, the lower end portion of the arranged-member insertion portion 43 can be opened. The opening improves accessibility to the arranged-member insertion portion 43 to make the installation and maintenance of the arranged members 39 to 42 smooth.

Figure 10:
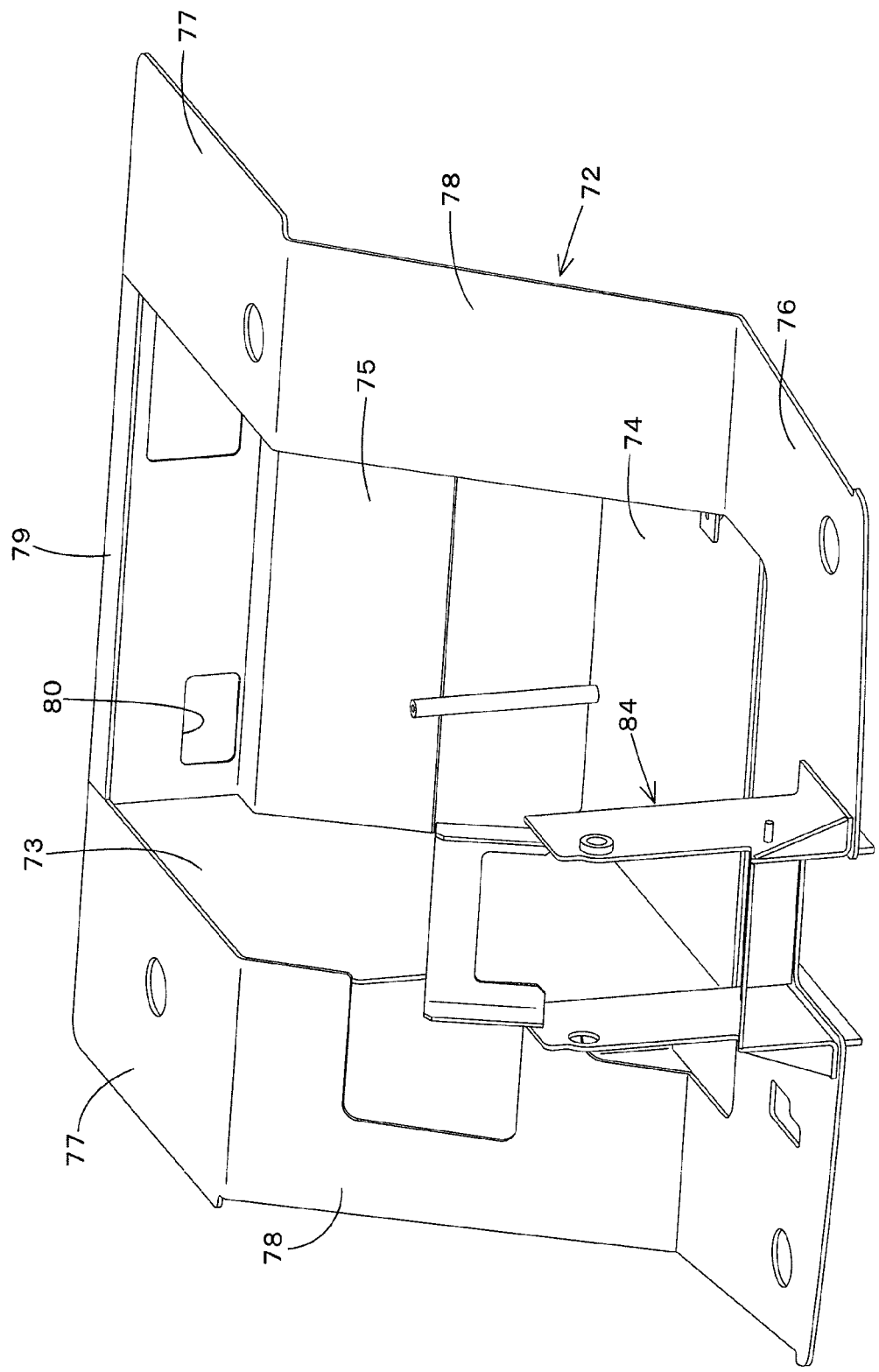
FIG. 10 is a perspective view of a floor frame.

The rear machine body 2B includes a floor frame 72 shown in FIG. 3 and FIG. 10. The floor frame 72 includes: a pair of side walls 73, one of the side walls being provided on the right side (a right side wall) and the other one being provided on the left side (a left side wall); a bottom wall 74 configured to joint a lower end of the right side wall 73 and a lower end of the left side wall 73 to each other; a back wall 75 extended upward from a back end of the bottom wall 74 to joint the lower ends of the right side wall 73 and left side wall 73 to each other; a floor portion 76 (a step) expanding in the right to left direction (or the left to right direction) more than the bottom wall 74 expands, the floor portion 76 being arranged in front of the bottom wall 74; an expanding portion 77 extended from the upper end of the right side wall 73 and from the upper end of the left side wall 73 in the outward direction along the right to left direction (or along the left to right direction); a right tilt wall 78 extending upwardly backward from a back edge of a right side portion of the floor portion 76 to be jointed to a front edge of the expanding portion 77; a left tilt wall 78 extending upwardly backward from a back edge of a left side portion of the floor portion 76 to be jointed to a front edge of the expanding portion 77; and a joint plate 79 jointed to a side of a back end of the expanding portion 77 provided on the right side (the right expanding portion 77) and to a side of a back end of the expanding portion 77 provided on the left side (the left expanding portion 77), thereby jointing the right expanding portion 77 and the left expanding portion 77 to each other.

The floor portion 76 is supported by the mount brackets 24 provided on the right side and left side of a front portion of the machine frame 19 at the right side and left side of the floor portion 76, specifically the floor portion 76 is supported by the anti-vibration mounts included in the mount brackets 24 to prevent the floor portion 76 from vibrating. In addition, the right expanding portion 77 is supported by the mount bracket 24 provided on the right side of a rear portion of the machine frame 19, specifically the right expanding portion 77 is supported by the anti-vibration mounts included in the mount bracket 24 to prevent the right expanding portion 77 from vibrating. The left expanding portion 77 is supported by the mount bracket 24 provided on the left side of the rear portion of the machine frame 19, specifically the left expanding portion 77 is supported by the anti-vibration mounts included in the mount bracket 24 to prevent the left expanding portion 77 from vibrating. In this manner, the floor frame 72 is supported by the machine frame 19 to be free from the vibration.

Moreover, the cabin 14 is opened at a side corresponding to a bottom surface of the cabin 14. The cabin 14 is mounted on the right expanding portion 77 and left expanding portion 77 included in the floor frame 72 at both of a right side and left side of a rear portion of the cabin 14, thus being attached and fixed to the right expanding portion 77 and left expanding portion 77. The cabin 14 is mounted on the floor portion 76 of the floor frame 72 at a front portion of the cabin 14, thus being attached and fixed to the floor portion 76. Accordingly, the cabin 14 is supported by the mount brackets 24 provided on the front portion rear portion of the machine frame 19, specifically the cabin 14 is supported by the anti-vibration mounts included in the mount bracket 24 to prevent the cabin 14 from vibrating.

Figure 11:
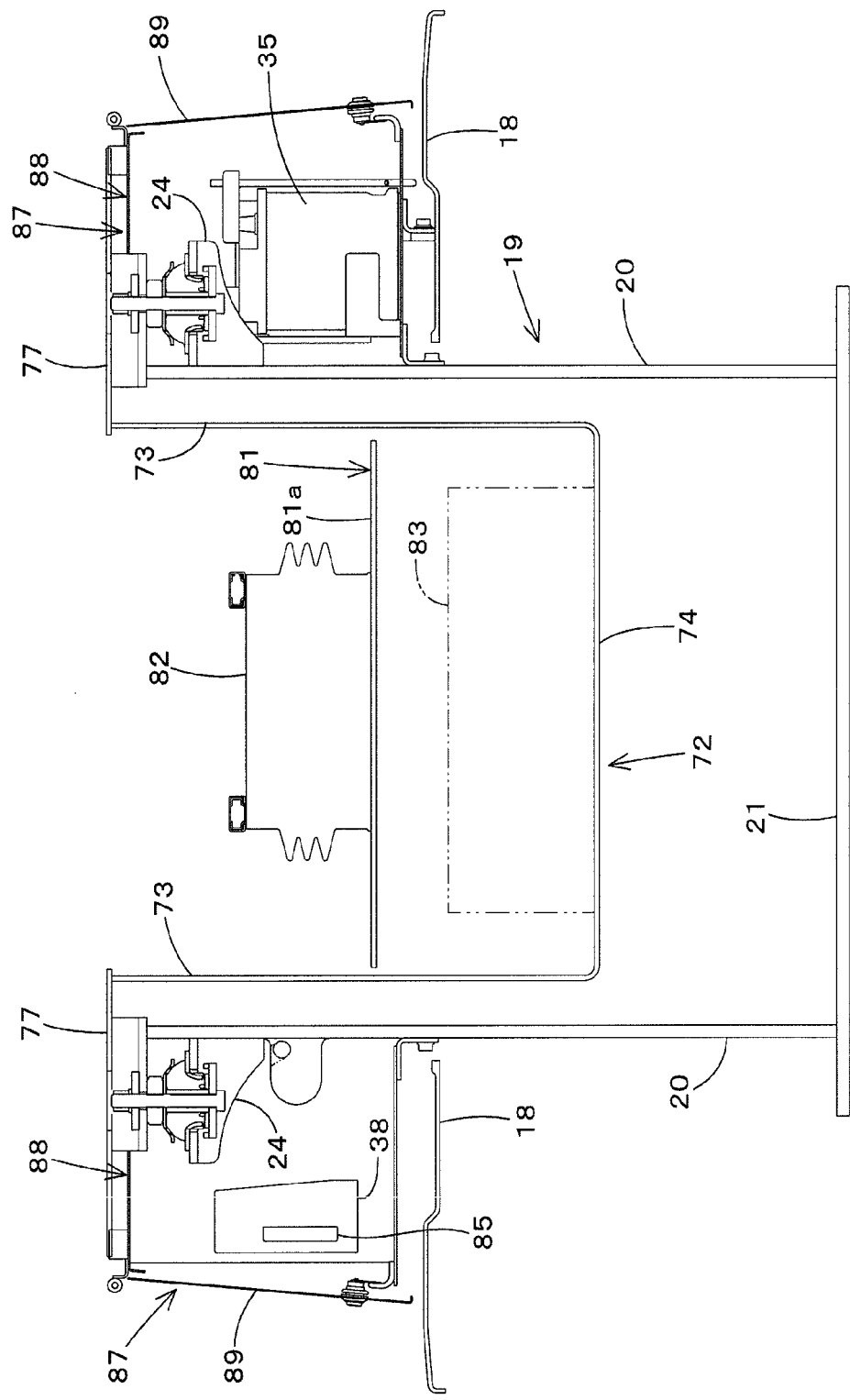
FIG. 11 is a cross-sectional view of a front surface of the machine frame.

As shown in FIG. 11, the right side wall 73 of the floor frame 72 is arranged on an inward side of the right side plate 20 of the machine frame 19 in the right to left direction (or along the left to right direction), the right side plate 20 being provided on an identical side of the right side wall 73 in the right to left direction (or along the left to right direction). The left side wall 73 of the floor frame 72 is arranged on an inward side of the left side plate 20 of the machine frame 19 in the right to left direction (or along the left to right direction), the left side plate 20 being provided on an identical side of the left side wall 73 in the right to left direction (or along the left to right direction).

As shown in FIG. 10, a hole (an opening) 80 is formed on a right side of an upper portion of the back wall 75 included in the floor frame 72, the hole 80 being formed for insertion of the above-mentioned pipe member 39 (the refrigerant return hose 39) and pipe member 40 (the refrigerant supply hose 40).

As shown in FIG. 3 and FIG. 11, a seat base 81 is fixed on the bottom wall 74 included in the floor frame 72. An operator seat attachment base 82 for mounting the operator seat 13, for example a seat suspension is provided on the seat base 81, thus the operator seat 13 is provided on the operator seat attachment base 82.

A space is formed between an upper wall 81a of the seat base 81 and the bottom wall 74 of the floor frame 72. The air conditioner main body 83 is arranged in the space.

As shown in FIG. 10, a support frame 84 is provided to a front segment of the floor portion 76, the support frame 84 is configured to support, for example, a handle post.

As shown in FIG. 11, the right expanding portion 77 included in the floor frame 72 extends toward an outward direction along the right to left direction (or along the left to right direction) over an upper end of the intermediate portion 20A of the right side panel 20 included in the machine frame 19, thus the right expanding portion 77 is positioned above the rear wheel fender 18 provided on a side identical to the right expanding portion 77 in the right to left direction (or the left to right direction). The left expanding portion 77 included in the floor frame 72 extends toward an outward direction along the right to left direction (or along the left to right direction) over an upper end of the intermediate portion 20A of the left side panel 20 included in the machine frame 19, thus the left expanding portion 77 is positioned above the rear wheel fender 18 provided on a side identical to the left expanding portion 77 in the right to left direction (or the left to right direction). In addition, the right tilt wall 78 of the floor frame 72 steeply stands, thereby forming a large space vertically between the right expanding portion 77 and the rear wheel fender 18 provided on the right side. The left tilt wall 78 of the floor frame 72 steeply stands, thereby forming a large space vertically between the left expanding portion 77 and the rear wheel fender 18 provided on the left side. A parts container box 87 is arranged in the space between the right expanding portion 77 and the rear wheel fender 18 provided on the right side, and another parts container box 87 is arranged in the space between the left expanding portion 77 and the rear wheel fender 18 provided on the left side, the parts container boxes 87 houses maintenance parts such as the battery 35, the fuse box 38, a relay box 85, a washer fluid tank 86, and the like.

The parts container boxes 87 each include a box main body 88 and an opening/closing cover 89, the box main body 88 is attached to the machine frame 19, the opening/closing cover 89 opens and closes an opening formed in the box main body 88, the opening facing outward in the right to left direction (or along the left to right direction).

Figure 12:
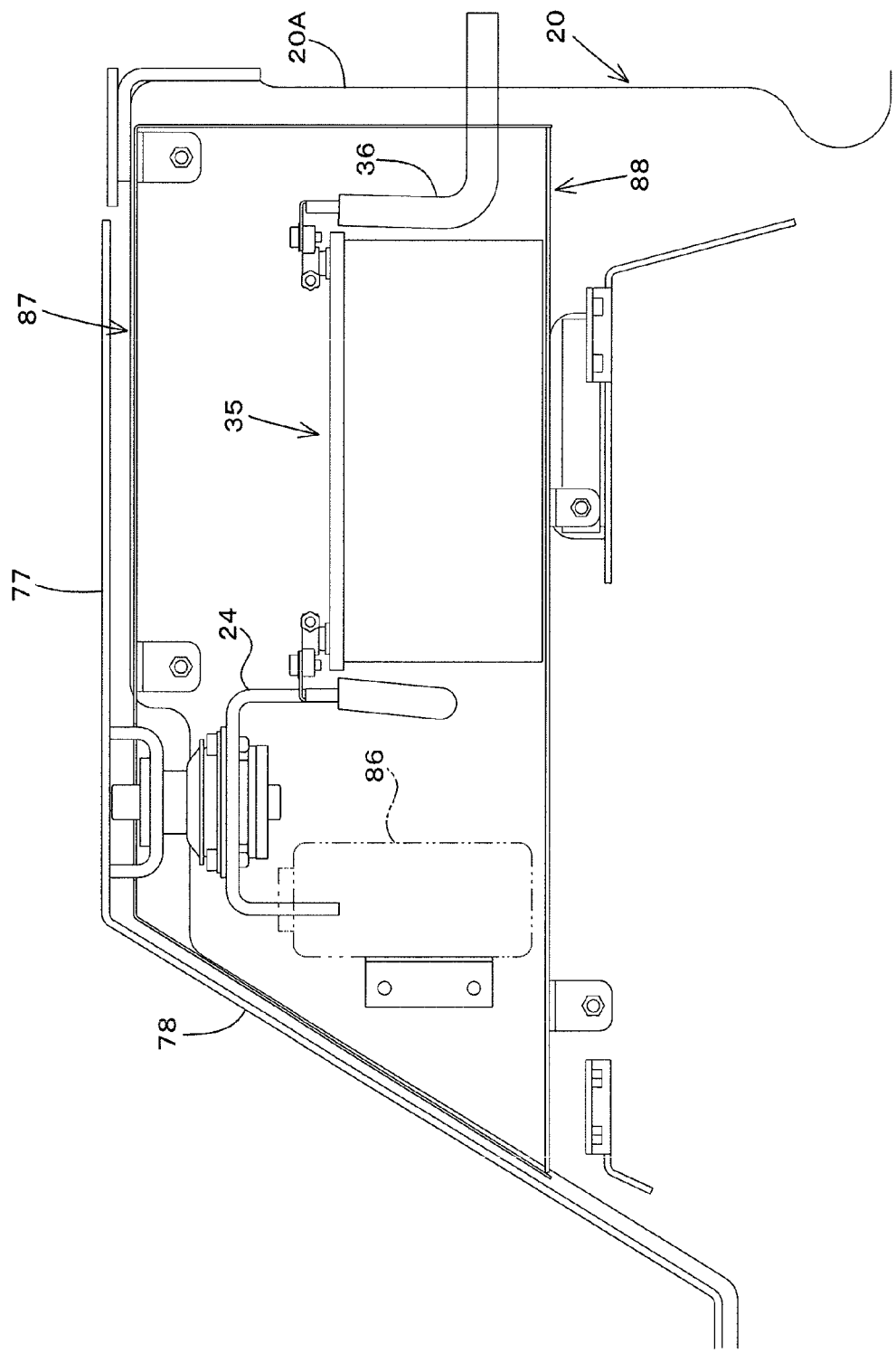
FIG. 12 is a side view of an inside of a component storage box provided on a left side.
Figure 13:
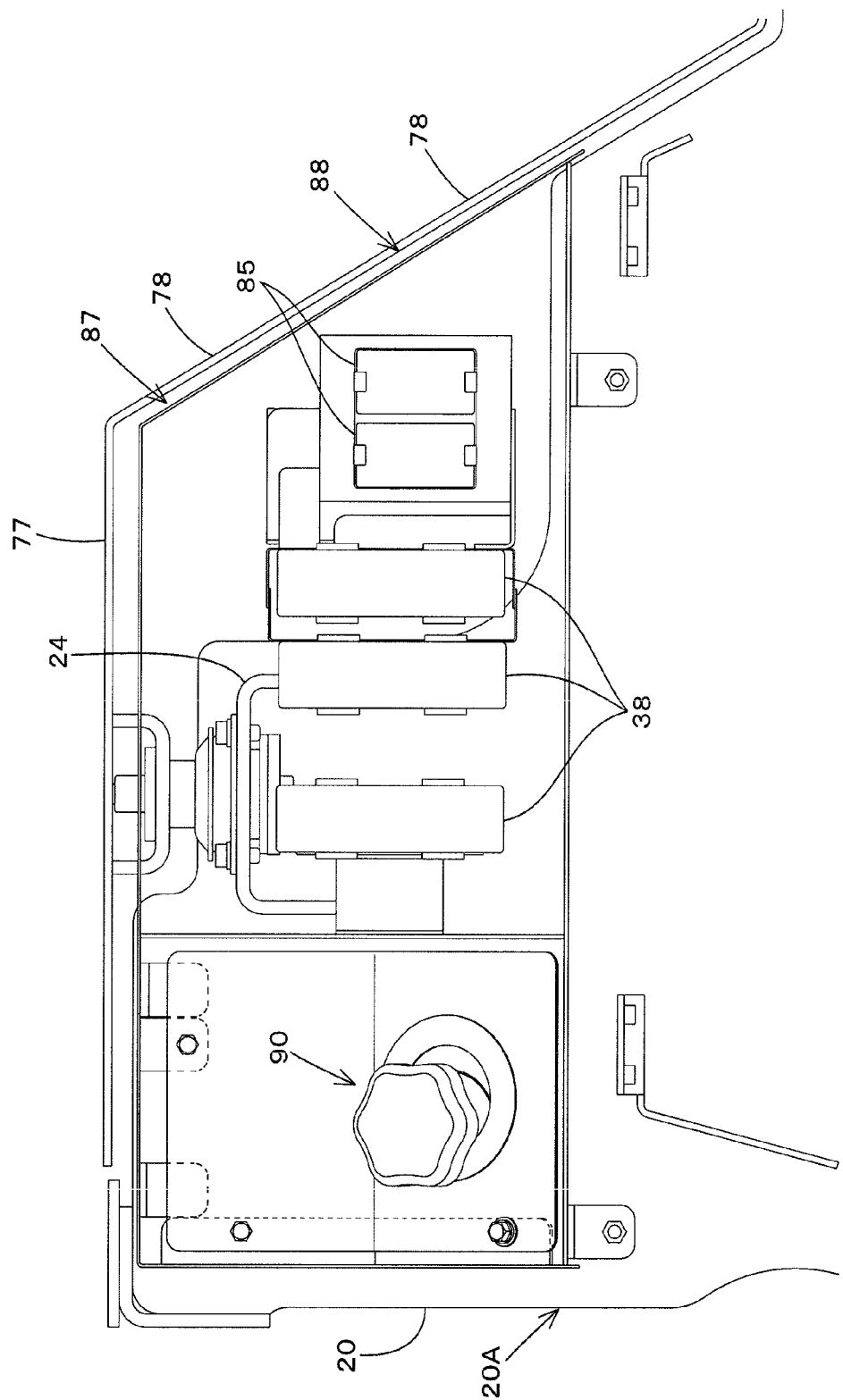
FIG. 13 is a side view of an inside of a component storage box provided on a right side.

As shown in FIG. 12, the parts container box 87 provided on the left side arranges inside the washer fluid tank 86, the battery 35, and the mount bracket 24 provided on the left rear side. As shown in FIG. 13, the parts container box 87 provided on the right side arranges inside the fuse box 38, the relay box 85, the mount bracket 24 provided on the right rear side, and a fuel filler opening 90.

What is claimed is:

1. A working machine comprising:
  an operator seat;
  a right side panel provided on a right side of the operator seat;
  a left side panel provided on a left side of the operator seat;
  a joint structure configured to joint an upper portion of an intermediate portion of the right side panel and an upper portion of an intermediate portion of the left side panel to each other, the joint structure including:
    a lower member configured to joint an upper portion of the right side panel and an upper portion of the left side panel to each other;
    an upper member provided above the lower member with a clearance kept from the lower member;
    a front joint member configured to joint a front portion of the upper member and a front portion of the lower member to each other; and
    a rear joint member configured to joint a rear portion of the upper member and a rear portion of the lower member to each other; and
  a wire harness configured to be installed between the lower member and the upper member to be wired from one of the right side panel and left side panel to the other side.

2. A working machine comprising:
  an operator seat;
  a right side panel provided on a right side of the operator seat;
  a left side panel provided on a left side of the operator seat; and
  a joint structure configured to joint an upper portion of an intermediate portion of the right side panel and an upper portion of an intermediate portion of the left side panel to each other, the joint structure including:
    a lower member configured to joint an upper portion of the right side panel and an upper portion of the left side panel to each other;
    an upper member provided above the lower member with a clearance kept from the lower member;
    a front joint member configured to joint a front portion of the upper member and a front portion of the lower member to each other; and
    a rear joint member configured to joint a rear portion of the upper member and a rear portion of the lower member to each other, wherein
  the lower member includes:
    an installation member extends between the upper portions of the right side panel and the left side panel to be welded to the right side panel and to the left side panel; and
    a plate member is overlapped with an upper surface of the installation member to be attached to the upper surface,
  the front joint member and the rear joint member joint the plate member and the upper member to each other, and
  the rear joint member is attached to a back surface of the installation member at a lower portion of the rear joint member.

3. A working machine comprising:
an operator seat;
a right side panel provided on a right side of the operator seat;
a left side panel provided on a left side of the operator seat;
a joint structure configured to joint an upper portion of an intermediate portion of the right side panel and an upper portion of an intermediate portion of the left side panel to each other, the joint structure including:
- a lower member configured to joint an upper portion of the right side panel and an upper portion of the left side panel to each other;
- an upper member provided above the lower member with a clearance kept from the lower member;
- a front joint member configured to joint a front portion of the upper member and a front portion of the lower member to each other; and
- a rear joint member configured to joint a rear portion of the upper member and a rear portion of the lower member to each other;

a bottom plate configured to joint a lower portion of the right side panel and a lower portion of the left side panel to each other;
an engine mounted on a rear portion of the bottom plate;
an engine room for installation of the engine; and
a front upper cover attached to the front joint member, wherein
the joint structure is arranged in the front upper portion of the engine room, and
the front upper cover covers the joint structure and covers a front upper portion of the engine room.

4. The working machine according to claim 3, further comprising:
an engine hood configured to cover the engine from above and to be freely opened and closed; and
a bracket for supporting the engine hood, the bracket being fixed to an upper surface of the upper member and pivotally supporting the engine hood to freely open and close the engine hood.

5. The working machine according to claim 4, further comprising:
a gas spring configured to hold the engine hood to be opened; and
a pivot configured to be pivotally jointed to the gas spring, the pivot being provided on each of the right side and left side of the upper member.

* * * * *